United States Patent [19]

Romero et al.

[11] Patent Number: 5,376,975
[45] Date of Patent: Dec. 27, 1994

[54] METHOD AND APPARATUS FOR PREAMBLE BATTERY SAVING IN SELECTIVE CALL RECEIVERS

[75] Inventors: Osvaldo D. Romero; Frank Fernandez; Timothy C. Laflin, all of Boynton Beach, Fla.; Pamela A. Rakolta, Cincinnati, Ohio

[73] Assignee: Motorola, Inc., Schaumburg, Ill.

[21] Appl. No.: 982,523

[22] Filed: Nov. 27, 1992

[51] Int. Cl.⁵ .............................................. H04Q 7/00
[52] U.S. Cl. ............................ 340/825.44; 455/38.3; 455/343
[58] Field of Search ..................... 340/825.44, 825.47; 455/343, 38.3, 228

[56] References Cited

U.S. PATENT DOCUMENTS

| | | | |
|---|---|---|---|
| 4,523,332 | 6/1985 | Mori | 455/343 |
| 4,663,623 | 5/1987 | Lax et al. | 340/825.44 |
| 4,691,382 | 9/1987 | Nakajima | 340/825.44 |
| 4,839,639 | 6/1989 | Sato et al. | 340/825.44 |
| 4,961,073 | 10/1990 | Drapac et al. | 340/825.44 |
| 4,995,099 | 2/1991 | Davis | 455/343 |
| 4,996,526 | 2/1991 | DeLuca | 340/825.44 |
| 5,077,758 | 12/1991 | DeLuca et al. | 375/95 |
| 5,095,498 | 3/1992 | DeLuca et al. | 375/94 |
| 5,241,568 | 8/1993 | Fernandez et al. | 455/343 |

Primary Examiner—Donald J. Yusko
Assistant Examiner—Edward Merz
Attorney, Agent, or Firm—Keith A. Chanroo; John Moore

[57] ABSTRACT

A selective call receiver receives a selective call signal (400) comprising a preamble signal (410). The selective call receiver comprises receiver circuitry (102) for receiving and demodulating the selective call signal (400). A preamble detector (105) is coupled to the receiver circuitry (102) for detecting the preamble signal (410), and a battery saver circuit (126) selectively activates and deactivates the receiver circuitry (102) in response to a signal from a processor (114). The processor (114) provides the signal to the battery saver circuit (126) to deactivate and activate the receiver circuitry (102) during reception of the preamble signal (410) in response to and subsequent to the preamble detector (105) detecting a portion of the preamble signal (410).

20 Claims, 4 Drawing Sheets

METHOD AND APPARATUS FOR PREAMBLE BATTERY SAVING IN SELECTIVE CALL RECEIVERS

FIELD OF THE INVENTION

This invention relates in general to selective call receivers, and in particular to a method and apparatus for battery saving in a selective call receiver.

BACKGROUND OF THE INVENTION

Selective call receivers, such as pagers, are typically small, portable electronic devices powered by batteries that receive selective call signals and demodulate and decode the signals to derive selective call messages addressed to the selective call receiver. The selective call receiver circuitry is designed to include low energy consuming components. Yet, with the desired performance characteristics, the components of the radio frequency (RF) receiver circuit are typically high energy consuming components. Accordingly, it is desirable to selectively energize and de-energize the receiver circuitry. This practice is called battery saving. Reliable battery saving methods energize the receiver circuitry during reception of appropriate portions of the selective call signals to assure that selective call messages addressed to the selective call receiver are received.

Selective call signals typically utilize a binary frequency shift keying (FSK) asynchronous modulation signaling protocol, e.g., the POCSAG signaling protocol originally proposed by British Telecom (POCSAG is an anagram for the Post Office Code Standardization Advisory Group). Conventional asynchronous protocols comprise a lengthy preamble, followed by a synchronization code word (sync code). The sync code contains a predetermined binary sequence used for frame synchronization. After detection of the preamble and the sync code, the protocol operates as a synchronous protocol comprising multiple words of information including address words and data words with the sync code repeated at regular intervals to maintain synchronous communication until the signal is dropped. The selective call receiver, while in synchronous communication, energizes and de-energizes the receiver circuitry in accordance with conventional battery saving routines.

Since detection of the preamble and the sync code following is crucial for converting from asynchronous operation to synchronous operation, the receiver circuitry typically is energized for long periods of time to search for the preamble and, once the preamble has been detected, the receiver circuitry remains energized until the sync code is detected.

Thus, what is needed is a reliable battery saving method and apparatus which can provide additional battery saving during asynchronous selective call receiver operation.

SUMMARY OF THE INVENTION

Accordingly, the present invention provides a method for battery saving in a selective call receiver. The selective call receiver comprises receiver circuitry for receiving and demodulating a selective call signal. The method comprises the steps of energizing the receiver circuitry, detecting a preamble signal from within the selective call signal, and battery saving during reception of the preamble signal in response to detection of the preamble signal.

In accordance with another aspect of the present invention, a selective call receiver for receiving a selective call signal comprises receiving means for receiving and demodulating the selective call signal, preamble detection means coupled to the receiving means for detecting a preamble signal from within the selective call signal, battery saving means coupled to the receiving means for selectively energizing and de-energizing the receiving means, and control means coupled to the preamble detection means and the battery saving means for controlling the battery saving means to perform battery saving during reception of the preamble signal in response to the preamble detection means detecting at least a portion of the preamble signal.

DETAILED DESCRIPTION OF THE INVENTION

Figure 1:
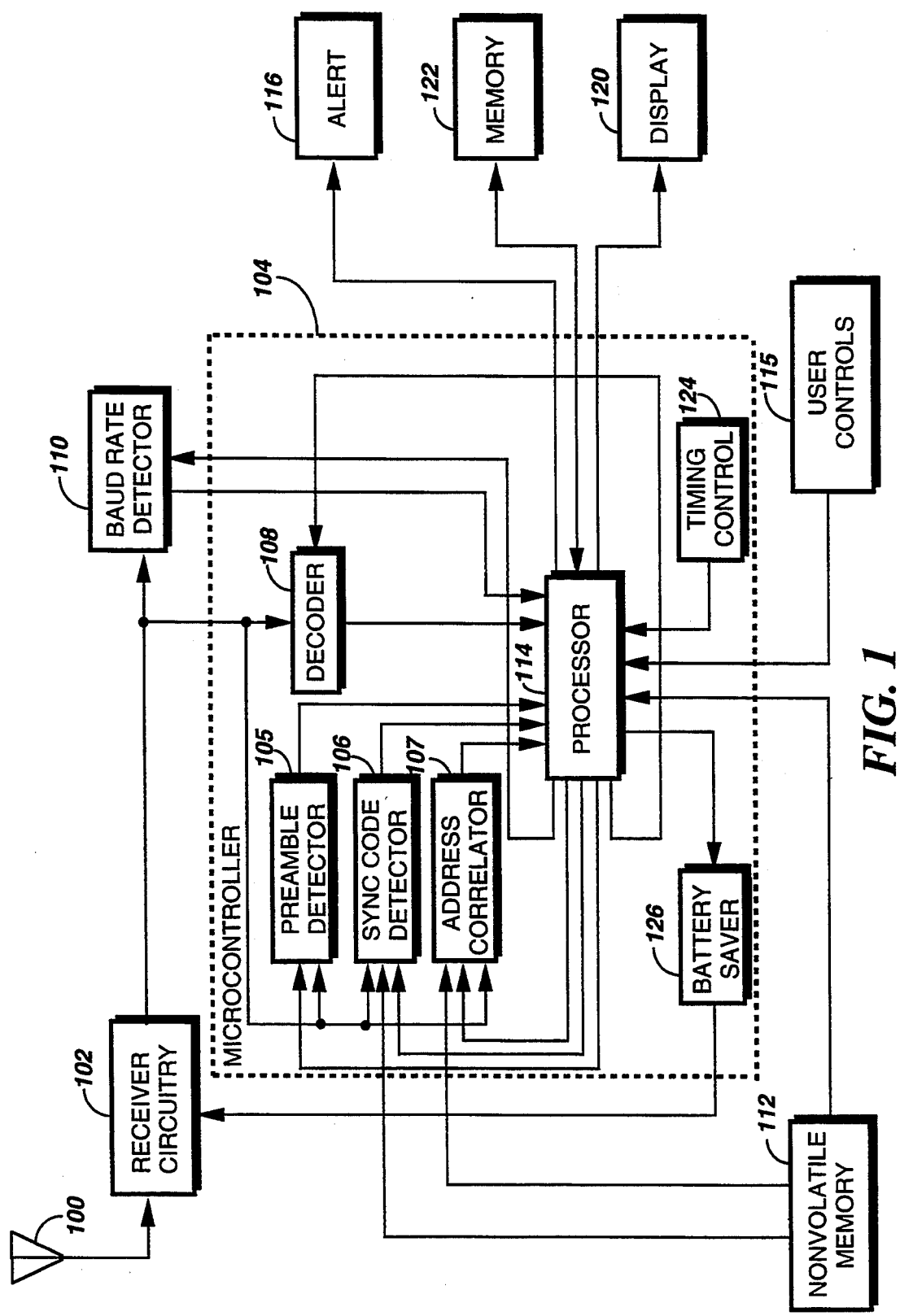
FIG. 1 is a block diagram of a selective call receiver in accordance with an embodiment of the present invention.

Referring to FIG. 1, an embodiment of a selective call receiver in accordance with the present invention is depicted. The asynchronous selective call signal is received at an antenna 100 of the selective call receiver. The signal is passed to receiver circuitry 102 which demodulates the signal. The receiver circuitry 102 provides the demodulated signal to a microcontroller 104 for processing and a baud rate detector 110 for detecting whether a signal is present. Within the microcontroller 104, the demodulated signal is provided to a preamble detector 105, a sync code detector 106, an address correlator 107, and a decoder 108.

Upon determination by the baud detector 110 that a selective call signal is being received, the baud rate detector 110 signals a processor 114, which controls the operation of the receiver. The processor 114 provides a start signal to the preamble detector 105 to begin attempted detection of the preamble code. The preamble detector 105 attempts to detect the preamble from within the demodulated signal by correlating a known preamble bit pattern with the demodulated signal. In accordance with the preferred embodiment of the present invention, the selective call signal is formatted according to the POCSAG signaling protocol and the preamble comprises at least 576 zero-to-one transitions. Upon correlating a number of alternating zero and one bits of the preamble within a certain bit error count (e.g., two), the preamble detector 105 provides a signal to the processor 114.

Upon activation of the sync code detector 106 by a signal from the processor 114, the sync code detector examines the demodulated signal to detect the occurrence of a predetermined synchronization code word (sync code). The predetermined sync code is stored in a nonvolatile memory 112 and is retrieved therefrom by the sync code detector 106 for comparison to the received signal. The sync code detector 106 provides a signal to the processor 114 in response to detection of the sync code within a certain error count.

The address correlator 107, upon reception of a start signal from the processor 114, attempts to correlate the information from the demodulated signal with a predetermined address or predetermined addresses assigned to the receiver and stored in the nonvolatile memory 112. Likewise, the address correlator 107 provides a signal to the processor 114 upon determination of address correlation or address noncorrelation. The decoder 108, thereafter, decodes the demodulated signal and provides the decoded signal to the processor 114.

A timing signal is generated by the processor 114 in accordance with timing signals from a timing control 124 within the microcontroller 104. The timing signal is provided to the baud rate detector 110 and is utilized thereby to determine, by examining bit edges or transitions, the baud rate or symbol rate of the signal. One such baud rate detector is disclosed in U.S. Pat. No. 5,095,498, commonly assigned to the assignee of the present invention. The baud rate detector 110 provides a signal to the processor 114 indicating the symbol rate of the signal for provision to the preamble detector 105, sync code detector 106, the address correlator 107, and the decoder 108 to assist the preamble detector 105 and the sync code detector 106 in detecting the preamble code and the sync code, respectively, to assist the address correlator 107 in correlating for the address of the selective call receiver, and to assist the decoder 108 in decoding the information from within the signal. In addition, the signal provided by the baud rate detector 110 to the processor 114 allows the processor 114 to determine, while in synchronous operation, whether the received signal is noisy (i.e., whether noise signals are present in the received signal causing the bit edges or transitions to be offset from their expected occurrence).

The processor 114 performs other conventional functions of a selective call receiver such as activating an alert 116 upon reception of a selective call message, receiving user inputs via user controls 115 and acting thereon, providing information such as selective call messages to a display 120 for viewing by the user, and providing selective call message information to and accessing selective call message information from a memory 122, such as a random access memory (RAM), for storage therein or recalling therefrom. The processor 114 also accesses information stored in the nonvolatile memory 112 for operation of the selective call receiver.

In accordance with the present invention, a battery saving circuit 126 provides a signal to the receiver circuitry 102 to energize or de-energize the receiver circuitry 102 to conserve battery power and extend battery life. The processor 114 provides an energization signal to the battery saving circuit 126 to energize or activate the receiver circuit at times after occurrence of an event as measured by the processor 114. In accordance with the present invention, the processor 114 provides a signal to the battery saving circuit 126 to de-energize (deactivate) the receiver circuitry 102 in response to signals from the preamble detector 105, the sync code detector 106, the address correlator 107, and the baud rate detector 110.

Figure 2:
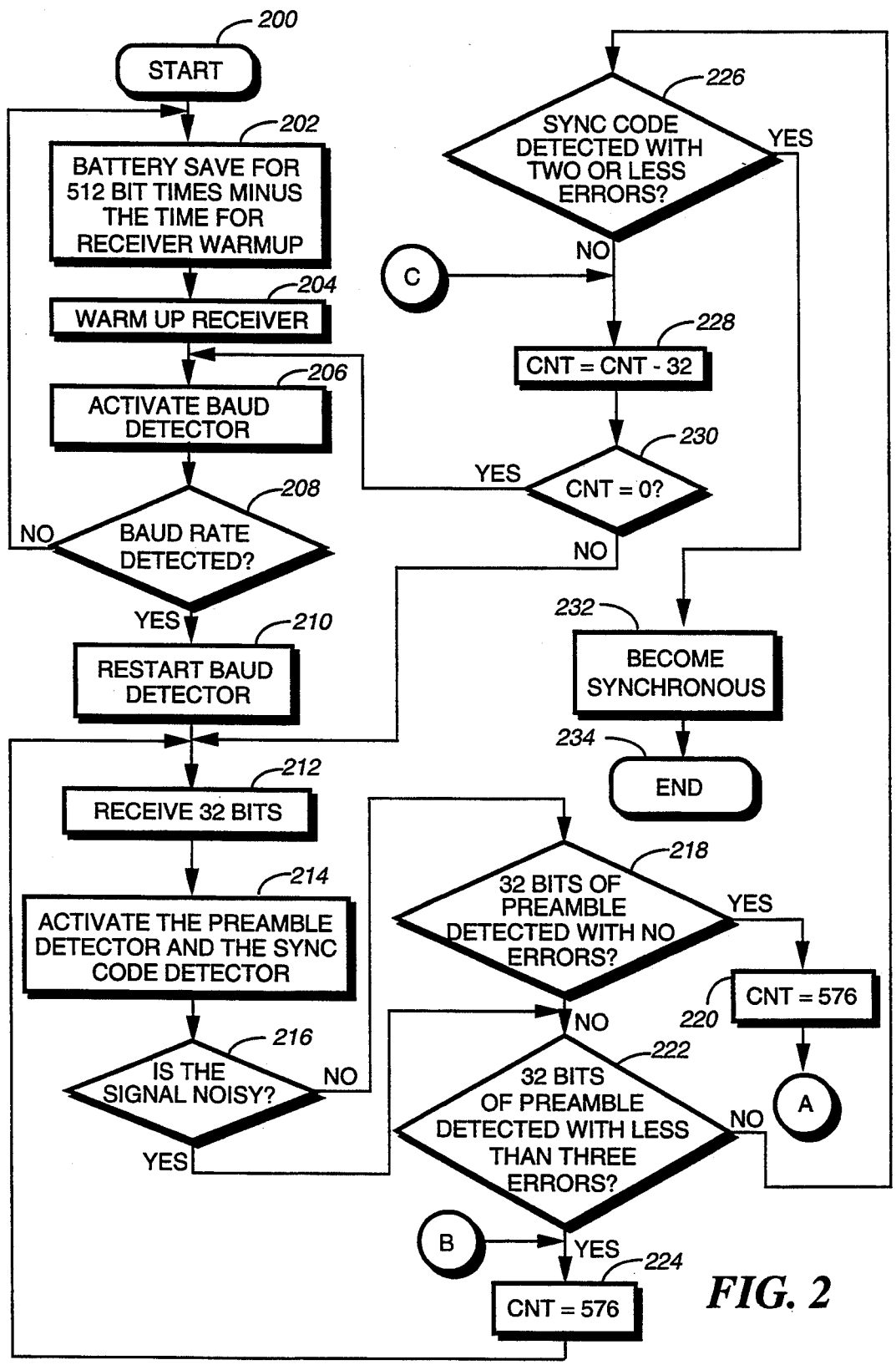
FIGS. 2 and 3 are flow charts of the operation of the selective call receiver processor of FIG. 1 in accordance with an embodiment of the present invention.
Figure 3:
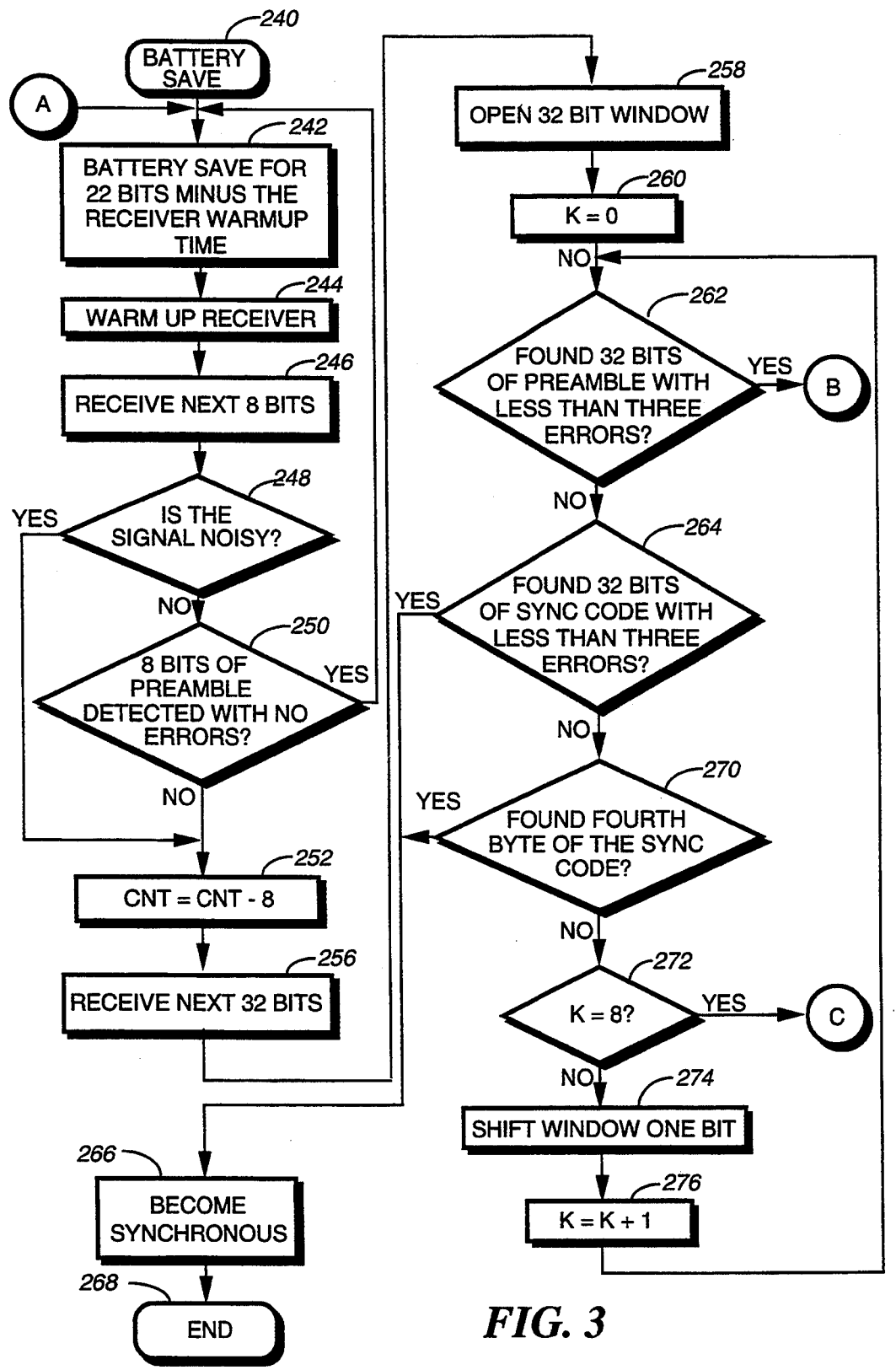

FIGS. 2 and 3 depict a flow chart showing the operation of the processor 114 (FIG. 1) during asynchronous operation wherein preamble and sync code detection is attempted in accordance with the preferred embodiment of the present invention. The operation begins 200 by battery saving 202 for 512 bit times minus the time for warm-up of the receiver circuitry 102 (FIG. 1). Every receiver circuit 102 has a known warm-up time. Typical present-day receiver warm-up times are in the range of ten milliseconds (ms), though improvements in crystallized, synthesized, and zero IF technologies are leading to even smaller receiver circuitry warm-up times. The processor 114 is preprogrammed with the receiver circuit 102 warm-up time, thereby allowing the processor 114 to signal the battery saver 126 to provide a signal to the receiver circuitry 102 to deactivate the receiver circuitry for 512-bit times less the receiver warm-up time.

After completion of the battery save time 202, the processor 114 signals the battery saver 126 to provide a signal to activate the receiver circuitry 102. Thus, the next step in the battery save process is that the receiver circuitry 102 warms up 204 for the receiver warm-up time. At the completion of the receiver warm-up time, the processor 114 signals the baud rate detector 110 to activate 206 in order to examine the demodulated signal from the receiver circuitry 102 to attempt baud rate detection. If the baud rate detector 110 does not detect baud rate 208, processing returns to battery save 202 by signaling the battery saver 126 to provide a deactivate signal to the receiver circuitry 102.

If a signal is received from the baud rate detector 110 indicating that the baud rate is detected 208, the processor 114, in response thereto, signals the baud rate detector 110 to restart 210 to detect bit edges or transitions. The next thirty-two bits are received 212 and the processor 114 signals the preamble detector 105 and the sync code detector 106 to activate 214.

The output of the baud rate detector 110 is examined to determine if the received signal is noisy 216. If the signal is not noisy 216 and the preamble detector 105 detects preamble within the thirty-two bits with no errors detected 218, a bit counter, CNT, is set equal to 576 (the minimum number of bits in a POCSAG preamble) 220 and additional battery saving in accordance with the present invention is performed as pictured in FIG. 3. If the signal being demodulated and decoded is other than POCSAG formatted, the counter, CNT, is set 220 to the number of bits in the preamble of the signaling protocol.

If the signal is noisy 216 and the preamble detector 105 detects within the thirty-two bits examined less than three errors 222, CNT is initialized 224 to equal 576 and processing returns to receive 212 the next thirty-two bits and make a similar examination. Likewise, if the signal is not noisy 216 and less than three errors are detected 222, the next thirty-two bits are received 212 and similarly examined.

If three or more errors are detected 222, the processor 114 examines the output from the sync code detector 106 to determine whether sync code is detected within the thirty-two bits with two or less errors 226. If sync code is not detected with two or less errors 226, the bit counter, CNT, is decremented by thirty-two 228 to show that thirty-two bits have been examined. If CNT has not been decremented to zero 230, processing returns to receive the next thirty-two bits 212 and examines those bits to determine whether preamble has been detected 216, 218, 222. When CNT is decremented to zero 230 indicating that the preamble has not been found within 576 bits, processing returns to activate 206 the baud rate detector 110 and search for the baud rate of the signal 208.

If the thirty-two--bit sync code is detected with two or less errors 226, the selective call receiver operation becomes synchronous 232 and the asynchronous battery saving routine of the present invention is ended 234.

Referring to FIG. 3, the preamble battery save routine, in accordance with the present invention, 240 is entered when preamble is detected with no noise and no errors 216, 218. Additionally, the battery save routine 240 can be entered if preamble has been detected with no errors in the sync code field or the address field of the signaling protocol. Thus, the processor 114 keeps the preamble detector 105 activated during sync code detection by the sync code detector 106 and address correlation by the address correlator 107. Upon a signal that preamble has been detected from the preamble detector 105, the processor 114 can enter the preamble battery save routine 240.

In accordance with the present invention, the preamble battery save routine 240 begins by battery saving 242 for twenty-two bits minus the time needed for warm-up of the receiver circuitry 102. The twenty-two-bit time is chosen in order to allow preamble battery saving without missing sync code during the battery saving interval as explained below in regards to FIG. 5.

Next, the processor 114 signals the battery saver 126 to activate the receiver circuitry 102 and the receiver circuitry 102 warms up 244. The next eight bits are received 246 and the processor 114 examines the output of the baud rate detector 110 to determine if the received signal is noisy 248. If the signal is not noisy 248, the processor examines the output of the preamble detector 105 to determine if the eight bits have been received as preamble with no errors 250. As long as the signal is not noisy 248 and the eight bits are detected as preamble with no errors 250, the battery save, in accordance with the present invention, takes place 242, 244, 246, 248, 250.

If the signal is noisy 248 or the preamble detector 105 signals the processor 114 that the eight bits have at least one error during preamble detection 250, the bit counter, CNT, is decremented by eight 252 and the next thirty-two bits are received 256. A thirty-two-bit window is then opened 258 for examination of the forty bits received in thirty-two-bit portions, initially entering the first thirty-two bits of the forty bits received into the thirty-two bit window. A window counter, K, is initialized to zero 260 and the first thirty-two bits of the forty bits received are examined.

As each thirty-two bits in the window is examined, the output from the preamble detector 105 is examined to see if thirty-two bits of preamble are found with less than three errors 262 and the output of the sync code detector 106 is examined to see if thirty-two bits of sync code have been detected 264 with less than three errors. If thirty-two bits of sync code have been detected within three errors 264, the selective call receiver operation becomes synchronous 266 and the asynchronous battery saving routine of the present invention is ended 268. If thirty-two bits of preamble are found with less than three errors 262, the processor 114 (FIG. 1) reinitializes 224 the preamble bit counter, CNT, to 576 and receives the next thirty-two bits 212 to examine those bits to determine whether preamble has been detected 216, 218, 222.

If neither thirty-two bits of preamble 262 nor thirty-two bits of sync code 264 have been detected with less than three errors, processing looks at the output of the sync code detector 106 to determine if the fourth byte of the sync code has been detected 270. If the fourth byte of the sync code has been detected 270, the selective call receiver operation becomes synchronous 266 and the asynchronous battery saving routine of the present invention is ended 268.

If the thirty-bits are determined not to be preamble 262, sync code 264, nor the fourth byte of the sync code 270, and the window counter, K, is not equal to eight 272, the thirty-two bit window is shifted one bit 274 so that another thirty-two bits can be examined and K is incremented by one 276. Processing then examines the new thirty-two bits in the window to determine if thirty-two bits of preamble (within less than three errors) are found 262, if the thirty-two bit sync code (within less than three errors) is found 264, or if the fourth byte of the sync code is found 270.

Within the forty bit sample, the thirty-two bit window can be shifted eight times, allowing a maximum of nine thirty-two-bit portions of the forty bits to be examined. Accordingly, when the window counter, K, equals eight, processing decrements the bit counter, CNT, by thirty-two 228 to show that the thirty-two bits received at step 256 have been examined. If CNT has not been decremented to zero 230, processing returns to receive the next thirty-two bits 212 and examines those bits to determine whether preamble has been detected 216, 218, 222. When CNT is decremented to zero 230 indicating that the preamble has not been found within 576 bits, processing returns to activate 206 the baud rate detector 110 and search for the baud rate 208 of the signal.

Figure 4:
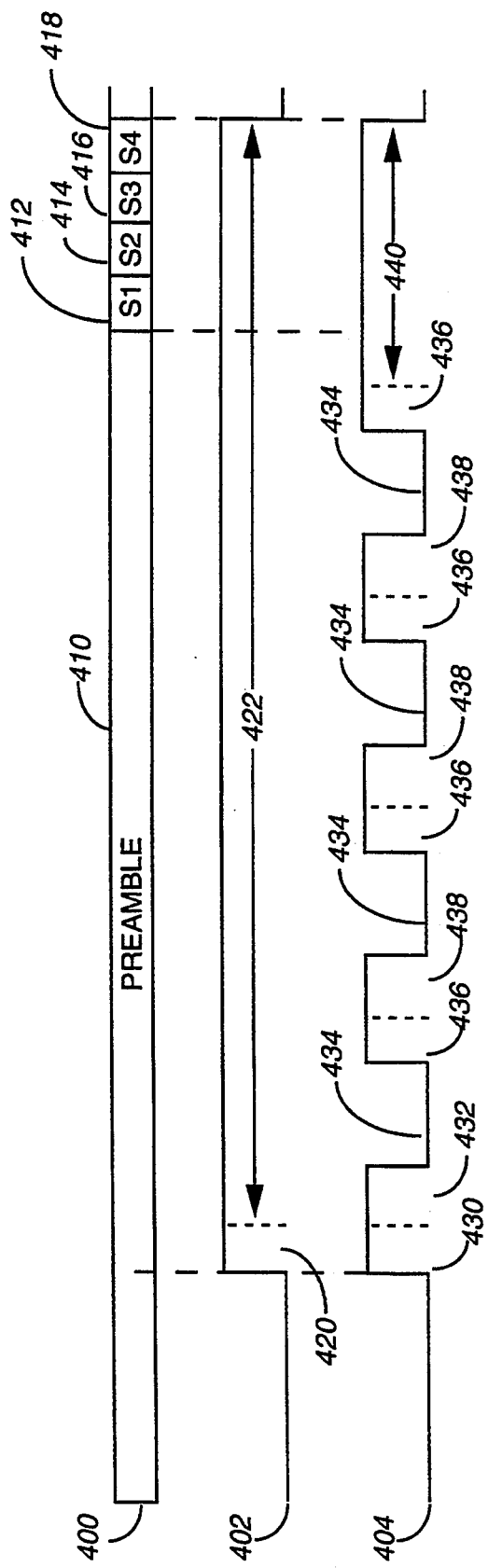
FIG. 4 is a timing diagram of the battery saving operation of a selective call receiver in accordance with an embodiment of the present invention as compared to the battery saving operation of a conventional selective call receiver.

Referring to FIG. 4, a timing diagram of the POCSAG protocol 400 compares a typical conventional battery saving scheme 402 to a battery saving scheme in accordance with the present invention 404. The POCSAG signal 400, as previously explained, comprises a preamble 410 and thirty-two bits of sync code consisting of four sync code bytes S1 (412), S2 (414), S3 (416), and S4 (418). Conventional battery saving 402 would activate the receiver circuitry 102 (FIG. 1) for a warm-up period 420 after which preamble detection is attempted. The preamble 410 is detected and the receiver circuitry 102 remains activated for the time period 422 until the four bytes 412, 414, 416, 418 of the sync code have been detected.

In accordance with the present invention, the receiver circuitry 102 is activated for a warm-up period 430 and then an eight-bit sample is examined 432. If preamble is detected, the receiver circuitry 102 is deactivated and battery saving occurs 434 for a period equal to twenty-two bit times minus the time for receiver warm-up 436. If, within the next eight-bit sample 438 the preamble is detected battery saving in accordance with the present invention is performed 434, 436, 438 until the sync code is detected and the receiver circuitry 102 remains activated for a period 440 until the fourth word of the sync code 418 is detected. The battery saving depicted 404 is the highest battery saving achieved by the present invention and assumes that noise is not present and that no errors are detected in the preamble received. Even in a noisy environment, the battery saving in accordance with the present invention does not consume more battery power than conventional battery saving 402.

Figure 5:
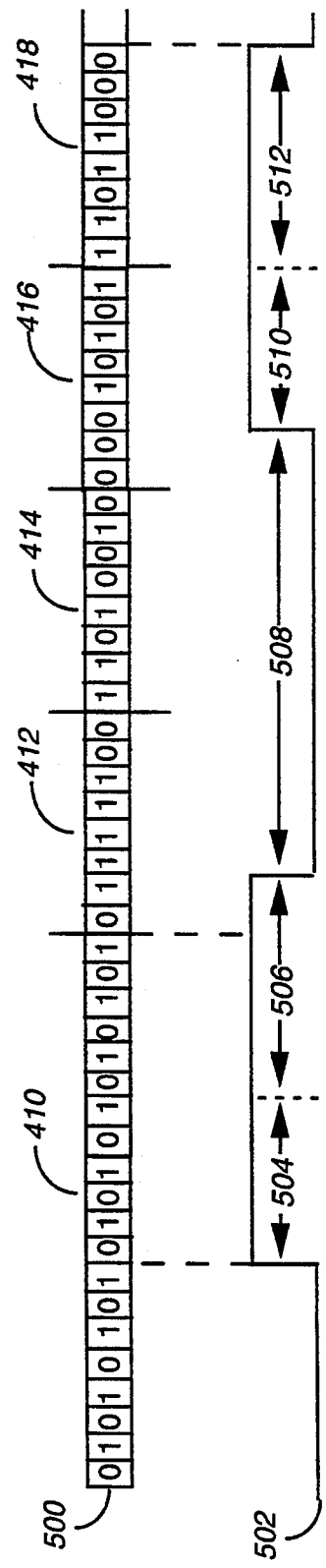
FIG. 5 is a timing diagram of another aspect of the battery saving operation of a selective call receiver in accordance with an embodiment of the present invention.

Referring next to FIG. 5, an examination of the worst case scenario of the operation of the preferred embodiment of the present invention reveals why a battery receive period of twenty-two bits is preferable. In the POCSAG signaling protocol 500, the preamble 410 consists of 576 bits of alternating zeros and ones. The sync code comprises four bytes (words) 412, 414, 416, 418, each word being predetermined and stored in the non-volatile memory 112. If after receiver warm-up 504 the battery saving routine 502 in accordance with the present invention detects eight bits of preamble with no errors 506 where the last two bits are actually part of the first sync code word 412, preamble battery saving deactivates the receiver circuitry 102 for twenty-two bits less receiver warm-up time 508. The receiver circuitry 102 is then reactivated and warms up 510, after which the next eight bits are examined 512 and determined to be the fourth word of the sync code 418. Therefore, the preferable choice of twenty-two bits compensates for the twenty-four bits of sync code words less two bits of the first sync code which is erroneously read as preamble. Therefore, practice of the present invention ensures that the receiver will be warmed up and ready to decode the last byte of the sync code 418.

Thus, it can be seen that after thirty-two bits of preamble are detected with no errors and no noise, additional battery saving results through the practice of the present invention by examining only eight bits of each thirty-two bits. The POCSAG signaling protocol is typically received at 512 bits per second (bps) or 1200 bps. Factoring in a typical ten ms warm-up time, a 56% improvement in battery saving results at 512 bps. At 1200 bps, given the ten ms warm-up time for the receiver circuitry 102, a 33% battery saving is achieved. As receiver circuitry design improves, such as through zero IF technology or synthesized or crystallized receiver components, the warm-up time for receiver circuitry 102 will decrease. With the decrease in receiver circuitry warm-up time, the battery saving in accordance with the present invention will increase so that substantial battery saving can occur during preamble detection at 512 bps, 1200 bps, 2400 bps, and higher data rates.

By now it should be appreciated that there has been provided a reliable battery saving method and apparatus which can provide additional battery saving during asynchronous selective call operation, particularly during preamble detection and after preamble detection but before the sync code is detected when selective call receiver operation is converting from asynchronous to synchronous operation.

We claim:

1. A method for battery saving in a selective call receiver comprising receiver circuitry for receiving and demodulating a selective call signal, the method comprising the steps of:
    energizing the receiver circuitry;
    detecting a preamble signal from within the selective call signal; and
    battery saving during reception of at least a portion of the preamble signal in response to detection of the preamble signal.

2. The method of claim 1 further comprising after the energizing step, the step of determining whether the selective call signal comprises noise signals, and wherein the step of battery saving comprises the step of battery saving during reception of the preamble circuit if the selective call signal does not comprise the noise signals.

3. The method of claim 1 wherein the preamble signal comprises a plurality of bits and wherein the step of detecting the preamble signal comprises the step of detecting a portion of the plurality of bits.

4. The method of claim 3 wherein the step of detecting the portion of the plurality of bits comprises the step of correlating with no bit errors the portion of the plurality of bits with a known preamble bit pattern.

5. The method of claim 1 wherein the step of battery saving comprises the steps of:
    de-energizing the receiver circuitry for a first predetermined time; and
    thereafter energizing the receiver circuitry.

6. The method of claim 5 further comprising after the second energizing step, the step of:
    determining whether a sync code signal is detected from within the selective call signal.

7. The method of claim 6 further comprising the step of repeating the de-energizing, the thereafter energizing, and the determining steps until the determining step determines that at least a portion of the sync code signal is detected within the selective call signal.

8. A selective call receiver for receiving a selective call signal, the selective call receiver comprising:
    receiving means for receiving and demodulating the selective call signal;
    preamble detection means coupled to the receiving means for detecting a preamble signal from within the selective call signal;
    battery saving means coupled to the receiving means for selectively energizing and de-energizing the receiving means; and
    control means coupled to the preamble detection means and the battery saving means for controlling the battery saving means to perform battery saving during reception of at least a portion of the preamble signal in response to the preamble detection means detecting the preamble signal.

9. The selective call receiver of claim 8 further comprising sync code detecting means coupled to the receiving means for detecting a sync code from within the selective call signal.

10. The selective call receiver of claim 9 wherein the sync code detecting means is coupled to the control means and wherein the control means controls the battery saving means to perform battery saving until the sync code detecting means detects at least a portion of the sync code.

11. The selective call receiver of claim 8 wherein the preamble detection means comprises:
    preamble correlating means for correlating the selective call signal with a predetermined preamble bit pattern;
    error counting means coupled to the preamble correlating means for accumulating a number of bit errors which occur between the selective call signal and the predetermined preamble bit pattern; and
    signal generating means for providing the accumulated number of bit errors to the control means in response to a predetermined number of bits of the selective call signal correlating with a corresponding predetermined number of bits of the predetermined preamble bit pattern.

12. The selective call receiver of claim 11 further comprising sync code detecting means coupled to the receiving means and the control means for detecting a sync code from within the selective call signal, and wherein the control means activates the sync code detecting means in response to the accumulated number of bit errors being greater than a first predetermined number of bit errors.

13. The selective call receiver of claim 12 wherein the first predetermined number of bit errors is two.

14. The selective call receiver of claim 11 wherein the control means controls battery saving means to perform battery saving during reception of the preamble signal in response to the accumulated number of bit errors being less than a second predetermined number of bit errors.

15. The selective call receiver of claim 14 wherein the second predetermined number of bit errors is one.

16. The selective call receiver of claim 8 wherein the control means comprises:
   determining means for determining whether the selective call signal comprises noise signals; and
   battery save control means for controlling the battery saving means to perform battery saving during reception of the preamble signal in response to the determining means determining that the selective call signal does not comprise noise signals.

17. A selective call receiver for receiving a selective call signal comprising a preamble signal, the selective call receiver comprising:
   receiver circuitry for receiving and demodulating the selective call signal;
   a preamble detector coupled to the receiver circuitry for detecting the preamble signal;
   a battery saver circuit for selectively activating and deactivating the receiver circuitry; and
   a controller coupled to the preamble detector and the battery saver circuit for controlling the battery saver circuit to deactivate and activate the receiver circuitry during reception of at least a portion of the preamble signal in response to and subsequent to the preamble detector detecting the preamble signal.

18. The selective call receiver of claim 17 further comprising a sync code detector coupled to the receiver circuitry for detecting a sync code from within the selective call signal.

19. The selective call receiver of claim 18 wherein the sync code detector is coupled to the controller and wherein the controller controls the battery saver circuit to deactivate and activate the receiver circuitry until the sync code detector detects at least a portion of the sync code.

20. The selective call receiver of claim 17 wherein the controller comprises:
   determining means for determining whether the selective call signal comprises noise signals; and
   battery save control means for controlling the battery saver circuit to deactivate and activate the receiver circuitry during reception of the preamble signal in response to the determining means determining that the selective call signal does not comprise noise signals.

* * * * *